United States Patent
Song et al.

(10) Patent No.: US 11,277,646 B2
(45) Date of Patent: Mar. 15, 2022

(54) REDUCING BANDING ARTIFACTS IN BACKWARD-COMPATIBLE HDR IMAGING

(71) Applicant: Dolby Laboratories Licensing Corporation, San Francisco, CA (US)

(72) Inventors: Qing Song, Sunnyvale, CA (US); Neeraj J. Gadgil, San Jose, CA (US); Guan-Ming Su, Fremont, CA (US); Peng Yin, Ithaca, NY (US); Arun Raj, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/282,523

(22) PCT Filed: Oct. 2, 2019

(86) PCT No.: PCT/US2019/054299
§ 371 (c)(1),
(2) Date: Apr. 2, 2021

(87) PCT Pub. No.: WO2020/072651
PCT Pub. Date: Apr. 9, 2020

(65) Prior Publication Data
US 2021/0368212 A1 Nov. 25, 2021

Related U.S. Application Data

(60) Provisional application No. 62/885,921, filed on Aug. 13, 2019, provisional application No. 62/740,512, filed on Oct. 3, 2018.

(30) Foreign Application Priority Data

Oct. 3, 2018 (EP) ..................................... 18198414

(51) Int. Cl.
*H04N 19/86* (2014.01)
*H04N 19/182* (2014.01)
(Continued)

(52) U.S. Cl.
CPC ........... *H04N 19/86* (2014.11); *H04N 19/117* (2014.11); *H04N 19/182* (2014.11); *H04N 19/189* (2014.11)

(58) Field of Classification Search
CPC .... H04N 19/86; H04N 19/182; H04N 19/189; H04N 19/117
See application file for complete search history.

(56) References Cited

U.S. PATENT DOCUMENTS

| 10,080,026 B2 | 9/2018 | Su |
| 2017/0221189 A1 | 8/2017 | Kheradmand |

(Continued)

FOREIGN PATENT DOCUMENTS

| JP | 2018511223 A | 4/2018 |
| WO | 2017165494 | 9/2017 |
| WO | 2020033573 | 2/2020 |

OTHER PUBLICATIONS

Daly, S. et al "Bit-Depth Extension Using Spatiotemporal Microdither Based on Models of the Equivalent Input Noise of the Visual System" Visual communications and Image Processing, vol. 5008, Jan. 1, 2003, pp. 455-466.

(Continued)

*Primary Examiner* — Shawn S An

(57) ABSTRACT

Methods and systems for reducing banding artifacts when displaying high-dynamic-range images reconstructed from coded reshaped images are described. Given an input image in a high dynamic range (HDR) which is mapped to a second image in a second dynamic range, banding artifacts in a reconstructed HDR image generated using the second image (Continued)

are reduced by a) in darks and mid-tone regions of the input image, adding noise to the input image before being mapped to the second image, and b) in highlights regions of the input image, modifying an input backward reshaping function, wherein the modified backward reshaping function will be used by a decoder to map a decoded version of the second image to the reconstructed HDR image. An example noise generation technique using simulated film-grain noise is provided.

15 Claims, 5 Drawing Sheets

(51) Int. Cl.
*H04N 19/189* (2014.01)
*H04N 19/117* (2014.01)

(56) References Cited

U.S. PATENT DOCUMENTS

| | | | |
|---|---|---|---|
| 2018/0007356 A1* | 1/2018 | Kadu | G06T 5/009 |
| 2018/0096467 A1 | 4/2018 | Viacheslav | |
| 2018/0220144 A1* | 8/2018 | Su | H04N 19/30 |
| 2019/0104309 A1* | 4/2019 | Su | H04N 19/37 |
| 2019/0110054 A1 | 4/2019 | Su | |
| 2019/0222866 A1* | 7/2019 | Song | H04N 19/186 |
| 2019/0349607 A1* | 11/2019 | Kadu | H04N 19/117 |
| 2020/0267392 A1* | 8/2020 | Lu | H04N 19/182 |
| 2021/0092461 A1* | 3/2021 | Gadgil | H04N 19/186 |
| 2021/0195221 A1 | 6/2021 | Song | |

OTHER PUBLICATIONS

Eilertsen, G. et al "Real-Time Noise-Aware Tone Mapping" ACM Transactions on Graphics, vol. 34, No. 6, Oct. 26, 2015.
ITU-R BT. 2100 "Image Parameter Values for High Dynamic Range Television for Use in Production and International Programme Exchange" ITU, Jul. 2016.
ITU-R BT.2020-2, "Parameter Values for Ultra-High Definition Television Systems for Production and International Programme Exchange" ITU-R BT.2020-2, Oct. 2015, pp. 1-8.
ITU-R BT.709-6 "Parameter Values for the HDTV Standards for Production and International Programme Exchange", Jun. 2015, pp. 1-19.
Miller, S. et al "Perceptual Signal Coding for More Efficient Usage of Bit Codes" SMPTE Motion Imaging Journal, May/Jun. 2013, pp. 52-59.
Minoo, A. et al "Description of the Reshaper Parameters Derivation Process in EETM Reference Software" JCT-VC Meeting, Feb. 19-26, 2016, San Diego.
RDD 5:2006—SMPIE Registered Disclosure Doc—Film Grain Technology—Specifications for H.264 | MPEG-4 AVC Bitstreams, in RDD 5:2006 , vol., No., pp. 1-18, Mar. 6, 2006.
SMPTE 2084:2014 "High Dynamic Range Electro-Optical Transfer Function of Mastering Reference Displays" Aug. 16, 2014.
Subhayan, M. et al "Adaptive Dithering Using Curved Markov-Gaussian Noise in the Quantized Domain for Mapping SDR to HDR Image" Smart Multimedia—Proceedings of the First International Conference, Aug. 24-26, 2018.

* cited by examiner

REDUCING BANDING ARTIFACTS IN BACKWARD-COMPATIBLE HDR IMAGING

CROSS-REFERENCE TO RELATED APPLICATIONS

This application claims the benefit of priority to U.S. Provisional Patent Application No. 62/885,921, filed Aug. 13, 2019, U.S. Provisional Patent Application No. 62/740,512, filed Oct. 3, 2018, and EP Patent Application No. 18198414.7, filed Oct. 3, 2018, all of which are incorporated by reference in their entirety.

TECHNOLOGY

The present application relates generally to images. More particularly, an embodiment of the present invention relates to reducing banding artifacts in high-dynamic range (HDR) images reconstructed from standard-dynamic range (SDR) images using a backwards reshaping function.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n≥8 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

In a traditional image pipeline, captured images are quantized using a non-linear opto-electronic function (OETF), which converts linear scene light into a non-linear video signal (e.g., gamma-coded RGB or YCbCr). Then, on the receiver, before being displayed on the display, the signal is processed by an electro-optical transfer function (EOTF) which translates video signal values to output screen color values. Such non-linear functions include the traditional "gamma" curve, documented in ITU-R Rec. BT.709 and BT. 2020, the "PQ" (perceptual quantization) curve described in SMPTE ST 2084, and the "HybridLog-gamma" or "HLG" curve described in and Rec. ITU-R BT. 2100.

As used herein, the term "forward reshaping" denotes a process of sample-to-sample or codeword-to-codeword mapping of a digital image from its original bit depth and original codewords distribution or representation (e.g., gamma or PQ or HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

As used herein, the term "banding" (also referred to as "color banding") refers to a visual artifact in imaging and video where shades of the same color are displayed as bands of varying luminance. When visible, banding is visually annoying and is often considered an indicator of low-quality encoding or of a low-quality display. As appreciated by the inventors here, improved techniques for reducing banding when displaying video content, especially HDR content, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
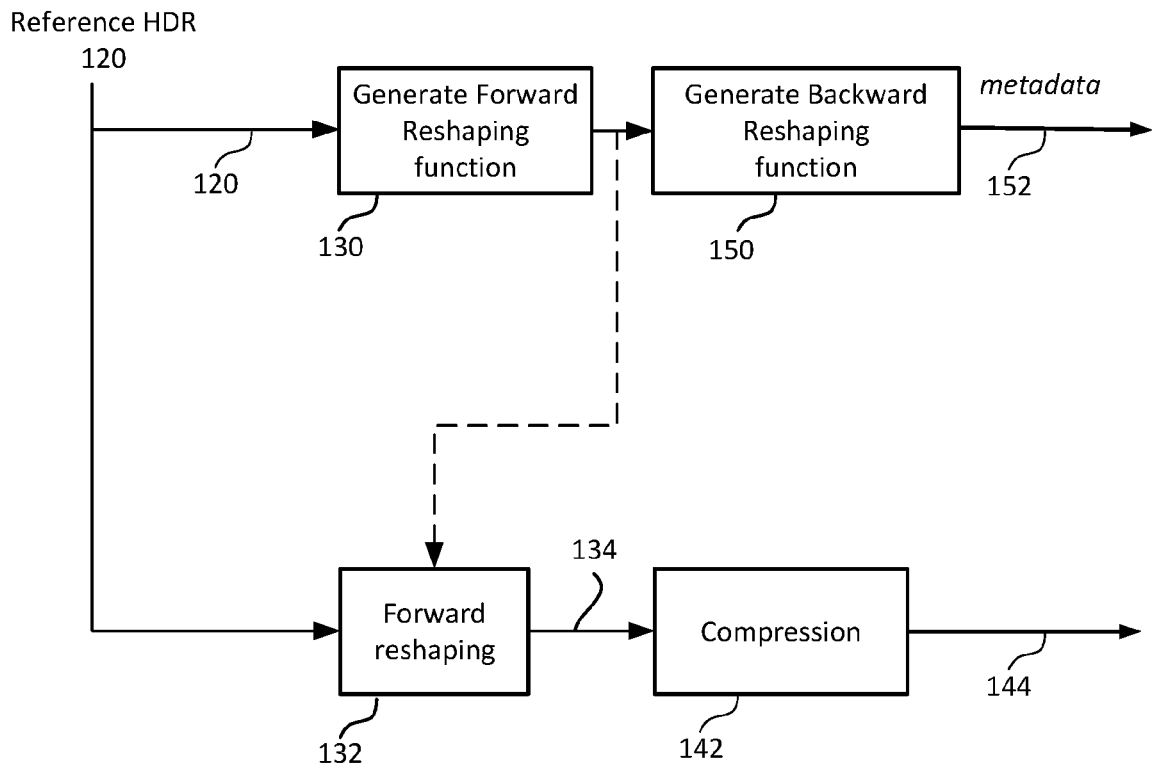
FIG. 1A depicts an example single-layer encoder for HDR data using a reshaping function according to an embodiment of this invention.

Reducing banding artifacts in HDR images and video content by noise injection and proper adaptation of a reshaping image-mapping function is described herein. Given an HDR image, a forward reshaping function to generate a reshaped image from the input HDR image, and a backward reshaping function to reconstruct the HDR image using the reshaped image, banding is reduced by: a) adding film-noise in the darks and mid-tones of the HDR image and b) updating the backward reshaping function in the highlights so that an output HDR image generated by applying the updated reshaping function to the reshaped image has reduced or no banding artifacts. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to reducing banding artifacts in HDR pictures. In an embodiment, in an apparatus comprising one or more processors, a processor receives: an input image in a first dynamic range, an input forward reshaping function mapping codewords from the first dynamic range to a second dynamic range, wherein the second dynamic range is equal or lower than the first dynamic range, and a first backward reshaping function based on the input forward reshaping function, wherein the first backward reshaping function maps codewords from the second dynamic range to the first dynamic range. The processor divides the luma range of the input image into a first luma region (e.g., darks and mid-tones) and a second luma region (e.g., highlights). Then, for luma pixel values of the input image in the first luma region, the processor generates output noise and adds the output noise to the luma pixel values of the input image to generate a dithered input image, wherein the standard deviation of the output noise is based on first statistical data derived from the input image, the forward reshaping function, and a risk measure of banding artifacts in the first luma region, and applies the forward reshaping function to the dithered input image to generate a reshaped input in the second dynamic range. For luma pixel values of the input image in the second luma region, the processor modifies the first backward reshaping function to generate a second backward reshaping function, wherein the first backward reshaping function is modified based on second statistical data derived from the input image, the forward reshaping function, and a risk measure of banding artifacts in the second luma region. The processor codes the reshaped input to generate a coded input, and communicates to a decoder the coded input and the second backward reshaping function.

In a decoder, a processor receives the coded input and the second backward reshaping function, decodes the coded input to generate a first output image in the second dynamic range, and applies the second backward reshaping function to the first output image to generate a second output image in the first dynamic range.

Example HDR Coding System

Figure 1B:
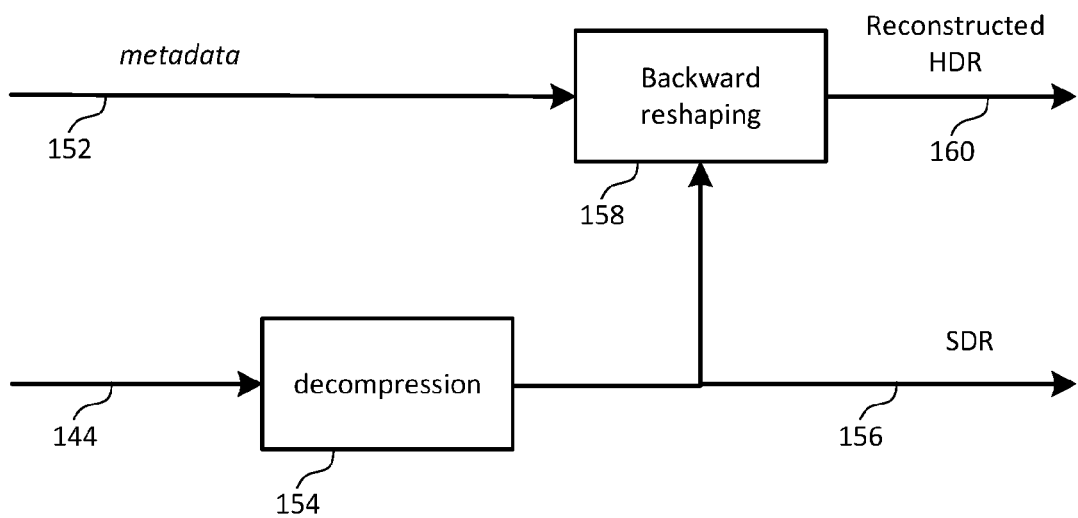
FIG. 1B depicts an example HDR decoder corresponding to the encoder of FIG. 1A, according to an embodiment of this invention.

As described in WIPO Publication WO 2017/165494, "Encoding and decoding reversible, production-quality single-layer video signals," and U.S. Provisional Patent Application, Ser. No. 62/720,375, (the '375 Application) "High-fidelity full-reference and high-efficiency reduced reference encoding in end-to-end single-layer backward compatible encoding pipeline," filed on Aug. 21, 2018, both of which are incorporated herein by reference in their entirety, FIG. 1A and FIG. 1B illustrate an example single-layer backward-compatible codec framework using image reshaping. More specifically, FIG. 1A illustrates an example encoder-side codec architecture, which may be implemented with one or more computing processors in an upstream video encoder. FIG. 1B illustrates an example decoder-side codec architecture, which may also be implemented with one or more computing processors in one or more downstream video decoders.

Under this framework, given reference HDR content (120), corresponding SDR content (134) (also to be referred as base-layer (BL) or reshaped content) is encoded and transmitted in a single layer of a coded video signal (144) by an upstream encoding device that implements the encoder-side codec architecture. The SDR content is received and decoded, in the single layer of the video signal, by a downstream decoding device that implements the decoder-side codec architecture. Backward reshaping metadata (152) is also encoded and transmitted in the video signal with the SDR content so that HDR display devices can reconstruct HDR content based on the SDR content and the backward reshaping metadata.

As illustrated in FIG. 1A, the backward compatible SDR images, such as the SDR images (134), are generated using a forward reshaping function (132). Here, "backward-compatible SDR images" may refer to SDR images that are specifically optimized or color graded for SDR displays. A compression block 142 (e.g., an encoder implemented according to any known video coding algorithms, like AVC, HEVC, AV1, and the like) compresses/encodes the SDR images (134) in a single layer 144 of a video signal.

The forward reshaping function in 132 is generated using a forward reshaping function generator 130 based on the reference HDR images (120). Given the forward reshaping function, a forward reshaping mapping step (132) is applied to the HDR images (120) to generate reshaped SDR base layer 134. In addition, a backward reshaping function generator 150 may generate a backward reshaping function which may be transmitted to a decoder as metadata 152.

Examples of backward reshaping metadata representing/specifying the optimal backward reshaping functions may include, but are not necessarily limited to only, any of: inverse tone mapping function, inverse luma mapping functions, inverse chroma mapping functions, lookup tables (LUTs), polynomials, inverse display management coefficients/parameters, etc. In various embodiments, luma backward reshaping functions and chroma backward reshaping functions may be derived/optimized jointly or separately, may be derived using a variety of techniques as described in the '375 Application.

The backward reshaping metadata (152), as generated by the backward reshaping function generator (150) based on the SDR images (134) and the target HDR images (120), may be multiplexed as part of the video signal 144, for example, as supplemental enhancement information (SEI) messaging.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (134) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder-side architecture of FIG. 1A can be used to avoid directly encoding the target HDR images (120) into coded/compressed HDR images in the video signal; instead, the backward reshaping metadata (152) in the video signal can be used to enable downstream decoding devices to backward reshape the SDR images (134) (which are encoded in the video signal) into reconstructed images that are identical to or closely/optimally approximate the reference HDR images (120).

In some embodiments, as illustrated in FIG. 1B, the video signal encoded with the SDR images in the single layer (144) and the backward reshaping metadata (152) as a part of the overall image metadata are received as input on the decoder side of the codec framework. A decompression block 154 decompresses/decodes compressed video data in the single layer (144) of the video signal into the decoded SDR images (156). Decompression 154 typically corresponds to the inverse of compression 142. The decoded SDR images (156) may be the same as the SDR images (134), subject to quantization errors in the compression block (142) and in the decompression block (154), which may have been optimized for SDR display devices. The decoded SDR images (156) may be outputted in an output SDR video signal (e.g., over an HDMI interface, over a video link, etc.) to be rendered on an SDR display device.

In addition, a backward reshaping block 158 extracts the backward reshaping metadata (152) from the input video signal, constructs the optimal backward reshaping functions based on the backward reshaping metadata (152), and performs backward reshaping operations on the decoded SDR images (156) based on the optimal backward reshaping functions to generate the backward reshaped images (160) (or reconstructed HDR images). In some embodiments, the backward reshaped images represent production-quality or near-production-quality HDR images that are identical to or closely/optimally approximating the reference HDR images (120). The backward reshaped images (160) may be outputted in an output HDR video signal (e.g., over an HDMI interface, over a video link, etc.) to be rendered on an HDR display device.

In some embodiments, display management operations specific to the HDR display device may be performed on the backward reshaped images (160) as a part of HDR image rendering operations that render the backward reshaped images (160) on the HDR display device.

Example System for Reducing Banding Artifacts

Figure 2:
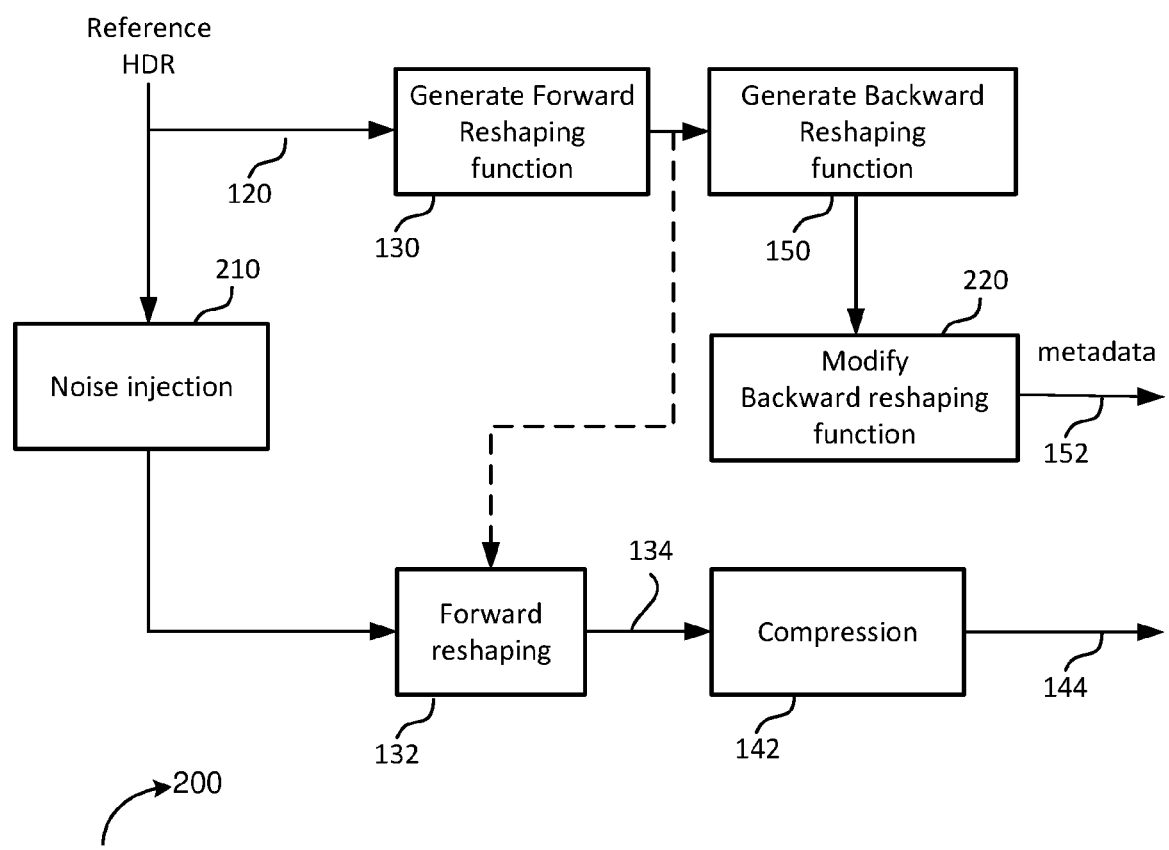
FIG. 2 depicts an example process for reducing banding artifacts according to an embodiment of this invention.

FIG. 2 depicts an example data flow (200) for reducing banding artifacts according to an embodiment. The workflow in FIG. 2 is very similar to the workflow in FIG. 1A, except for the addition of two new blocks: a noise injection unit (210) and backward reshaping function (to also be referred to as BLUT) modification unit (220). The role of the noise injection unit 210 is to reduce banding in the darks and mid-tones (e.g., up to about 100 nits), while the role of the BLUT modification unit 220 is to reduce banding in the highlights. A BLUT modification approach was also proposed in U.S. Provisional Patent Application Ser. No. 62/717,070 (the '070 Application), "Reducing banding artifacts in HDR imaging via adaptive SDR-to-HDR reshaping functions," by N.J. Gadgil et al., filed on Aug. 10, 2018, which is incorporated herein by reference; however, there are distinct differences between the two approaches, since each one attempts to meet different goals and requirements.

For example, in the '070 Application, the HDR data used to derive the backward reshaping function is derived from "master" SDR data that can't be modified in any way (say, by a reshaping function or other color grading). Since there is no master HDR data to make a comparison, there is greater freedom on how much the original BLUT may be modified. In this invention, while it is important to alleviate banding artifacts, it is also important to preserve the original look of the "master" HDR data (120), thus restricting how much the original BLUT can be changed. As another example, in the '070 Application, only the compressed master SDR data is available, so estimating the banding risk in the reconstructed HDR data may not be as accurate. In this invention, the banding risk can be estimated more accurately from the input HDR data.

The proposed method will also work if the base layer image (134) is replaced by an HDR image of the same or lower dynamic range than the reference HDR image (e.g., HDR image 120). For example, forward reshaping (132) may be used to compress more efficiently the reference HDR image (120).

Noise Injection

An analysis by the inventors of a number of possible alternatives to reduce banding artifacts yielded that there are two main approaches to mask banding artifacts without introducing a brightness shift: a) by injecting zero-mean noise to the input HDR image (120), or b) by injecting non-zero mean noise to the base layer (134) signal, where the mean of the noise matches the quantization error due to the HDR to SDR reshaping. In an embodiment, the first approach was selected, and FIG. 3 depicts an example process (210) for injecting noise into the original HDR input (120) to reduce banding artifacts in the decoder.

Figure 3:
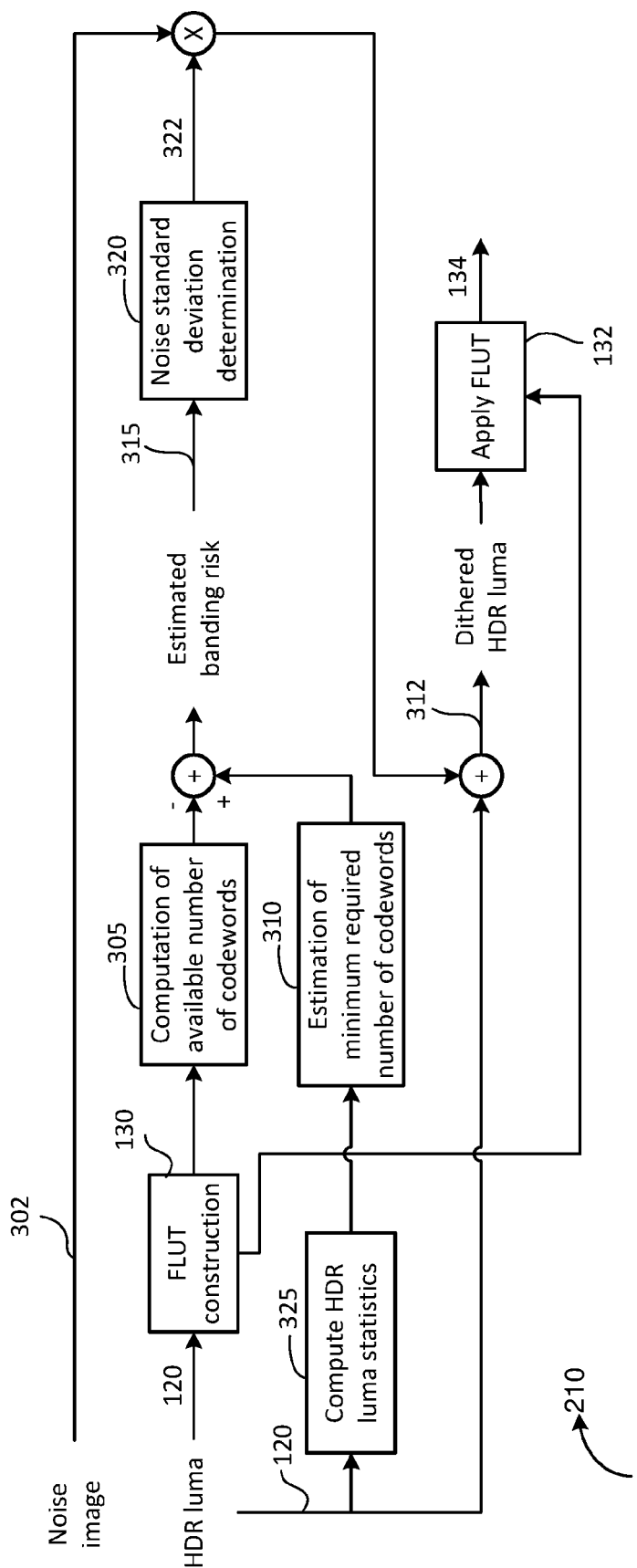
FIG. 3 depicts an example process for noise injection to reduce banding artifacts in dark and mid-tone regions according to an embodiment of this invention.

As depicted in FIG. 3, a noise image (302) is added to the luma (e.g. Yin a YCbCr representation) of the input HDR (120) to generate a dithered HDR luma (312), which is then reshaped using forward reshaping (132). The standard deviation (322) of the added noise (302) is computed in a series of steps which include: in step 325, estimating the standard deviation of the luminance values in the input HDR image, in step 305, computing the available number of codewords given the forward reshaping function (FLUT), in step 310, estimating the minimum number of required codewords to avoid banding artifacts, in step 315, estimating the risk of having banding artifacts, and in step 320, computing the noise standard deviation based on the risk of having banding artifacts. Next, each of these steps will be described in more detail.

While there is no limitation on how the noise signal 302 may be generated, as appreciated by the inventors, coarser film-grain-like noise is more likely to survive compression (142) and thus be more effective than other types of random noise (e.g., Gaussian) as dithering noise to mask banding artifacts. The visibility of the film grain depends on the grain size and the noise standard deviation. Larger grain and higher standard deviation yield more visible film grain noise, which is also more likely to survive compression and mask banding. Meanwhile, more visible film grain noise would be visually more annoying, especially at highlight regions, as the human visual system is less tolerant to noise at highlight.

As reported in the SMPTE Registered Disclosure Document "*Film Grain Technology—Specifications for H. 264 MPEG-4 AVC Bitstreams,*" in RDD 5-2006, vol., no., pp. 1-18, 6 Mar. 2006, SMPTE, which is incorporated herein by reference in its entirety, film-grain noise can be synthesized by a two-dimensional (2D) random field in the frequency domain. An $N_G \times N_G$ (e.g., $N_G=8$) film grain noise patch G(m, n) can be rendered by $$G(m,n) = p \cdot iDCT(Q(x,y)), \quad (1)$$

where Q(x,y) denotes the discrete cosine transform (DCT) coefficients, p is the noise standard deviation, and iDCT( ) denotes the inverse DCT. Some AC coefficients of Q(x,y) are normalized Gaussian values (i.e., norm-distributed) random numbers and the other coefficients (including DC) are zero. In other words, $$Q(i,j) \sim N(0,1) \text{ for } (i,j) \in \Omega, \quad (2)$$

$$Q(i,j) = 0 \text{ for } (i,j) \notin \Omega,$$

where $\Omega$ is the set of indices where DCT coefficients are norm-distributed, and where $(0,0) \notin \Omega$ for zero DC. When all the AC coefficients are norm-distributed random numbers, G(m, n) is white Gaussian noise. When only some low frequency AC coefficients are norm-distributed random numbers, G(m,n) appear as film grain noise. The fewer AC coefficients are norm-distributed, the larger grains would appear.

As depicted in FIG. 3, a film-grain noise image (302) with zero mean and unity standard deviation is first generated by stitching non-overlapping film grain noise patches. A deblocking filter can be applied on the patch boundaries to smooth the edges. For example, a three-tap filter with impulse response [1 2 1]/4 can be applied to pixels on the boundary. In an embodiment, multiple such noise images may be generated (e.g., 10 or more) to form a small set of noise images, and one may apply a different noise image from this set to each video frame in a sequence of input video frames. Note that using the same noise image in consecutive video frames may yield other unexpected artifacts.

In an embodiment, the standard deviation of the film-grain noise is adjusted according to the severity of the estimated banding. Without limitation, the set of indices where the DCT coefficients are norm-distributed, $\Omega$, can be fixed. For example, for a 8×8 DCT, $$\Omega = \{(i,j) | 2 \le i,j \le 5\}. \quad (3)$$

Then, the noise standard deviation, p (322), is determined based on the estimated banding risk (315). Higher noise standard deviation is set for higher banding risk.

In an embodiment, the banding risk is estimated by the difference between the minimum required number of codewords (310) and the available number of codewords (305) in a luminance range. The minimum required number of codewords is what is required to represent the luminance range to achieve an image without banding artifacts. It is estimated, in block 325, based on the standard deviation of luminance pixel values in the input HDR image.

The available number of codewords is the number of codewords used to represent the luminance range in the base layer or SDR image, which is determined by the forward reshaping function (FLUT). The same number of codewords will be used to represent the luminance range in the reconstructed HDR image because the BLUT function is the inverse of the FLUT function.

Suppose the luma plane of frame t in HDR image (120) contains P pixels. The frame, excluding a letter box and/or pillar box in the frame, is divided into $N_B$ non-overlapping blocks of $L_B \times L_B$ pixels (e.g., $L_B=16$).

$$N_B = \left\lfloor \frac{H}{L_B} \right\rfloor \cdot \left\lfloor \frac{W}{L_B} \right\rfloor,$$

where H is the picture height excluding the letter box, and W is the picture width excluding the pillar box. The last rows of pixels beyond $$\left\lfloor \frac{H}{L_B} \right\rfloor \cdot L_B$$

and the columns beyond $$\left\lfloor \frac{W}{L_B} \right\rfloor \cdot L_B$$

are ignored for the process below.

Denote as $v_{t,i}^Y$, the un-normalized value of pixel i of the HDR luma plane (e.g., Y). Let the bit depth of the HDR input be denoted as $b_E$. The normalized value of pixel i is $$\tilde{v}_{t,i}^Y = \frac{v_{t,i}^Y}{2^{b_E}}. \quad (4)$$

Given the normalized HDR luma pixel values, Table 1 denotes in pseudo-code an example process for determining the minimum number of required codewords. Part of the derivation relies on the description of U.S. Pat. No. 10,032, 262, (the '262 Patent) "Block-based content-adaptive reshaping for high dynamic range images," which is incorporated by reference in its entirety. After dividing the frame into non-overlapped blocks, for each block ($B_j$) one computes the standard deviation ($\sigma$) of the block. If one divides the HDR luma dynamic range into $N_L$ equidistant bins (e.g., $N_L=256$) (i.e., ranges of luma codewords), one may compute the average block-based standard deviation in each bin, and then determine the minimum required number of codewords in each luma bin based on the lower bound measured in the '262 Patent.

TABLE 1

Example process to estimate the minimum required number of codewords

```
// STEP 1: initialize average block standard deviation and histograms
σ̄_{t,k}^E = 0 for k = 0, 1, ..., N_L - 1;   // average block standard deviation
h_{t,k}^E = 0 for k = 0, 1, ..., N_L - 1;   // histogram
// STEP 2: compute block standard deviation of each block
for (j = 0; j < N_B; j ++) {
```

$$\mu = \frac{1}{L_B^2} \sum_{i \in B_j} v_{t,i}^Y;  \quad \text{// mean of block } B_j$$

$$\sigma = \sqrt{\frac{1}{L_B^2} \sum_{i \in B_j} (v_{t,i}^Y)^2 - (\mu)^2};  \quad \text{// standard deviation of block}$$

```
  for i ∈ B_j {
    k = ⌊v_{t,i}^Y · N_L⌋;        // bin index
    σ̄_{t,k}^E = σ̄_{t,k}^E + σ;    // accumulate block standard
                                    deviation
    h_{t,k}^E = h_{t,k}^E + 1;     // histogram
  }
}
// STEP 3: compute average block standard deviation
for (k = 0; k < N_L; k++ ) {
```

$$\bar{\sigma}_{t,k}^E = \frac{\sigma_{t,k}^E}{h_{t,k}^E};$$

```
}
// STEP 4: obtain minimum required bit depth b_{t,k}^E from σ̄_{t,k}^E for each
luma bin from the measured data (see US 10,032,262):
  b_{t,k}^E = g(σ̄_{t,k}^E) for k = 0, 1, ..., N_L - 1;
// Obtain minimum required number of codewords c̄_{t,k}^E for each luma bin:
```

$$\bar{c}_{t,k}^E = \frac{2^{b_{t,k}^E}}{N_L} \text{ for } k = 0, 1, \ldots, N_L - 1.$$

Regarding the function $g(\sigma_{t,k}^E)$, which maps standard-deviation values to the minimum required bit depth, as an example, and without limitation, in an embodiment $\sigma_{t,k}^E = [0\ 0.0002\ 0.0050\ 0.05\ 1]$ values may be mapped to a lower bound of $2^{b_{t,k}^E} = [2{,}000\ 1{,}500\ 900\ 200\ 200]$ codewords. Missing values may be interpolated from neighborhood values.

In Table 1, the example description uses a block-based approach to compute statistical data about the input image (e.g., $\sigma_{t,k}^E$ values); however, similar data can also be generated by using alternative methods. For example, one can compute a histogram of luma pixel values in each one of the $N_L$ luma bin ranges and then compute the standard deviation of all pixel values within each bin.

As used herein the term "un-normalized FLUT" denotes that the forward mapping is from un-normalized HDR codewords (e.g., $[0, 2^{b_E}-1]$) to un-normalized reshaped codewords (e.g., $[0, 2^{b_S}-1]$). For a "normalized FLUT," the mapping is from un-normalized HDR codewords to normalized reshaped codewords (e.g., $[0, 1]$). Similarly, the term "un-normalized BLUT" denotes that the backward or inverse mapping is from un-normalized reshaped codewords (e.g., $[0, 2^{b_S}-1]$) to un-normalized HDR codewords (e.g., $[0, 2^{b_E}-1]$). For a "normalized BLUT," the mapping is from un-normalized reshaped codewords to normalized HDR codewords (e.g., $[0, 1)$).

Denote as $FLUT_t$ the un-normalized FLUT of frame t. The number of codewords to represent each luma bin in the base layer is:

$$\hat{c}_{t,k}^E = FLUT_t\left(\frac{2^{b_E}}{N_L} \cdot (k+1)\right) - FLUT_t\left(\frac{2^{b_E}}{N_L} \cdot k\right), \quad (5)$$

$$\text{for } k = 0, 1, \ldots, N_L - 1.$$

Then, in an embodiment, the estimated banding risk (315) is $$r_{t,k}^E = \bar{c}_{t,k}^E - \hat{c}_{t,k}^E, \text{ for } k=0,1, \ldots, N_L-1. \quad (6)$$

A positive $r_{t,k}^E$ value indicates lack of codewords and potential banding artifacts. A negative $r_{t,k}^E$ value denotes no banding risk.

In an embodiment, higher noise standard deviation will be set for the luma bins with higher banding risk. For luma bins with negative banding risk, the noise standard deviation is set to a lower bound, which is non-negative. In an embodiment, the lower bound is set to a positive value such that the whole picture, excluding any letter box, would be dithered, and there wouldn't be a clear boundary between the positive-banding-risk regions and the negative-banding-risk regions.

As noise added to the highlights part of an image would be quite annoying, the noise standard deviation of the highlights part in a frame is also set to the lower bound. Suppose the separation point between highlights and darks part is $\tilde{Y}$ in normalized PQ domain ($\tilde{Y} \in [0,1)$), then the noise standard deviation of luma bins in the darks and midtones with positive banding risk is determined by a linear function of the banding risk bounded by a lower bound and an upper bound. For example, in an embodiment, the noise standard deviation $p_{t,k}$ (322) of each luma bin is determined by:

$$p_{t,k} = \begin{cases} \min(p^{max}, \max(p^{min}, a \cdot r_{t,k}^E + d)) & 0 \le k \le \lfloor \tilde{Y} \cdot N_L \rfloor \\ p^{min} & \text{elsewhere} \end{cases}, \quad (7)$$

where $p^{max}$ is the upper bound, $p^{min}$ is the lower bound, and a and d are constants, (e.g., for 16-bit HDR images, $p^{max}=1{,}500$, $p^{min}=300$, $a=120$, and $d=0$).

Let $n_{t,i}^Y$ denote the value of the i-th pixel in the noise image (302) for the t-th frame with initial standard deviation of 1. As depicted in FIG. 3, the dithered HDR image (312) is obtained by:

$$\tilde{v}_{t,i}^Y = \max(0, \min(2^{b_E}-1, v_{t,i}^Y + p_{t,k} \cdot n_{t,i}^Y)) \text{ for } i \in \Phi_t, \quad (8)$$

where $$k = \left\lfloor \frac{v_{t,i}^Y}{2^{b_E}} N_L \right\rfloor,$$

and $\Phi_t$ are the indices of pixels that belong to non-letterbox and non-pillar-box regions of frame t.

Given the dithered HDR image (312), and the forward reshaping function (FLUT), in step 132, the reshaped image (134) is computed as:

$$s_{t,i}^Y = FLUT_t(\tilde{v}_{t,i}^Y) \text{ for } i=0,1, \ldots, P-1, \quad (9)$$

where $s_{t,i}^Y$ is the i-th pixel of the reshaped luma plane of frame t.

Modification of the Backward Reshaping Function

Injecting noise to the whole input image can be visually annoying, as the human visual system is more sensitive (less tolerant) to noise in the highlight regions. If the base layer (144) is gamma-coded SDR, it is also more likely to produce blocky artifacts in highlight regions during compression, because encoders typically allocate fewer bits to those regions.

To reduce banding artifacts in the highlight regions, in an embodiment, in step 220, the slope of the backward reshaping function (BLUT) is adjusted for codewords that are estimated to have a potential banding risk. As the distance between adjacent codewords decreases, the decreased contrast reduces banding artifacts. The slope of BLUT is adjusted based on the estimated banding risk. As discussed earlier, a similar approach was also described in the '070 Application; however, the solution provided herein takes into consideration the availability of master HDR data (120), thus provides a more accurate prediction of banding artifacts.

Figure 4:
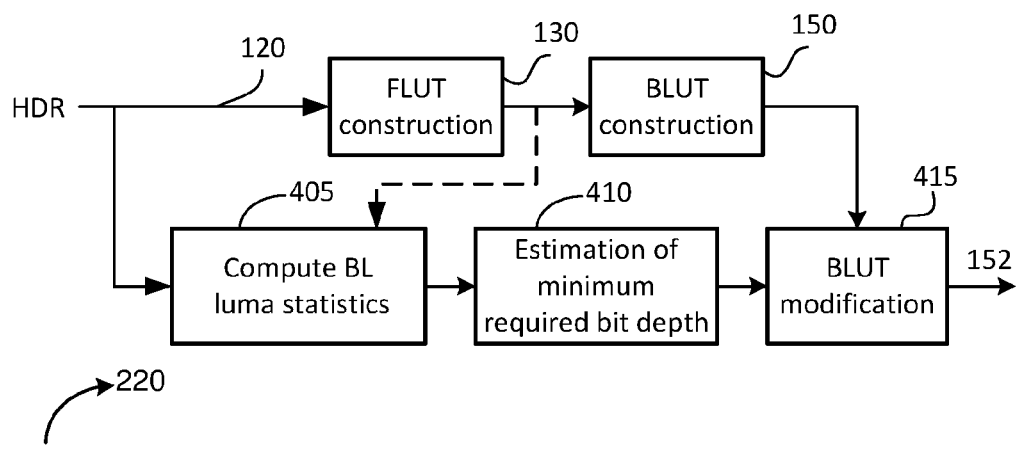
FIG. 4 depicts an example process to alleviate banding in highlight regions according to an embodiment of this invention.

FIG. 4 depicts an example process (220) for modifying a backward reshaping function to reduce banding artifacts in the highlights region according to an embodiment. It includes three main processing blocks: block 405, for computing the average standard deviation values of luminance pixel values in the reshaped input, block 410, for computing an estimate of the minimum required bit depth to represent the highlights with no banding artifacts, and block 415, which performs the final modification of the BLUT based on the minimum required bit depth.

Compared to the '070 Application, where only the SDR input is available, here, the source HDR (120) is also available, so computing base layer (BL) luma statistics (405) can be performed directly from the source HDR luma plane using the forward reshaping function. Unlike step 325, where the block standard deviation is averaged in every HDR bin, here the block standard deviation is averaged in every SDR bin. Next, a more detailed description of each block in 220 is provided.

In an embodiment, the SDR luma (134) is divided into $N_S$ bins (e.g., $N_S=64$), where $N_S$ is not necessarily equal to $N_L$. The available number of codewords in each SDR bin is fixed to $$\hat{c}_{t,k}^S = \frac{2^{b_S}}{N_S}, \text{ for } k = 0, 1, \ldots, N_S - 1, \tag{10}$$

where $b_S$, is the bit depth of the SDR signal (e.g., $b_S=8$ or 10). The luminance range represented by these codewords after mapping to the HDR domain is:

$$\hat{w}_{t,k}^S = BLUT_t\left(\frac{2^{b_S}}{N_S} \cdot (k+1)\right) - BLUT_t\left(\frac{2^{b_S}}{N_S} \cdot k\right) \text{ for bin } k, \tag{11}$$

where $BLUT_t(\cdot)$ is the normalized BLUT of frame t. The minimum required number of codewords to represent this luminance range is estimated by the block standard deviation. Table 2 explains how to compute the average block standard deviation for each SDR luma bin. The process is very similar to that presented in Table 1, but the bin index is determined differently. The generated block-based standard deviation will be used to adjust the BLUT slope.

TABLE 2

Example process to generate the minimum required bit depth estimation in SDR luma bins

```
// STEP 1: initialize average block standard deviation and histograms
σ̄_{t,k}^S = 0    for k = 0, 1, . . . , N_S − 1;    // average block standard deviation
h_{t,k}^S = 0    for k = 0, 1, . . . , N_S − 1;    // histogram
// STEP 2: compute block standard deviation of each block
for (j = 0; j < N_B; j ++) {
```

$$\mu = \frac{1}{L_B^2} \sum_{i \in B_j} v_{t,i}^Y; \quad \text{// mean of block } B_j$$

$$\sigma = \sqrt{\frac{1}{L_B^2} \sum_{i \in B_j} (v_{t,i}^Y)^2 - (\mu)^2}; \quad \text{// standard deviation of block}$$

for i ∈ $B_j$ {

$$k = \left\lfloor \frac{FLUT_t(v_{t,i}^Y)^2 \cdot N_S}{2^{b_S}} \right\rfloor; \quad \text{// bin index}$$

```
        σ̄_{t,k}^S = σ̄_{t,k}^S + σ;         // accumulate block standard deviation
        h_{t,k}^S = h_{t,k}^S + 1;           // histogram
    }
}
// STEP 3: compute average block standard deviation
for (k = 0; k < N_S; k++) {
```

$$\bar{\sigma}_{t,k}^S = \frac{\sigma_{t,k}^S}{h_{t,k}^S};$$

```
}
// STEP 4: obtain minimum required bit depth b_{t,k}^S from σ̄_{t,k}^S for each reshaped luma bin
// (see US 10,032,262 and earlier discussion for Table 1):
    b_{t,k}^S = g(σ̄_{t,k}^S) for k = 0, 1, . . . , N_S − 1;
```

The maximum luminance range that can be represented by the given number of codewords in an SDR bin without banding is:

$$\overline{w}_{t,k}^S = \frac{\hat{c}_{t,k}^S}{2^{b_{t,k}^S}} = \frac{2^{b_S}}{N_S \cdot 2^{b_{t,k}^S}}. \quad (12)$$

Denote as dLUT the difference between adjacent codewords after BLUT mapping:

$$dLUT_t(m) = BLUT_t(m+1) - BLUT_t(m). \quad (13)$$

Intuitively, the dLUT(m) value represents the first derivative or slope of the BLUT function for the m-th input SDR codeword. The relationship between dLUT and the luminance range represented by the available codewords, $\hat{w}_{t,k}^S$, is:

$$\hat{w}_{t,k}^S = \sum_{m=\frac{2^{b_S}}{N_S} \cdot k}^{\frac{2^{b_S}}{N_S} \cdot (k+1)-1} dLUT_t(m). \quad (14)$$

The above equation represents the covered HDR dynamic range within the k-th bin. To satisfy the maximum luminance range, dLUT of each codeword in bin k can be modified such that $$\frac{dLUT_t^{req}(m)}{dLUT_t(m)} = \frac{\overline{w}_{t,k}^S}{\hat{w}_{t,k}^S}, \text{ for } m = \frac{2^{b_S}}{N_S} \cdot k, \ldots, \frac{2^{b_S}}{N_S} \cdot (k+1)-1, \quad (15)$$

where $dLUT_t^{req}(m)$ is the new dLUT that satisfies the maximum luminance range, because the sum of $dLUT_t^{req}(m)$ in the bin will be equals to $\overline{w}_{t,k}^S$:

$$\sum_{m=\frac{2^{b_S}}{N_S} \cdot k}^{\frac{2^{b_S}}{N_S} \cdot (k+1)-1} dLUT_t^{req}(m) \quad (16)$$

$$= \sum_{m=\frac{2^{b_S}}{N_S} \cdot k}^{\frac{2^{b_S}}{N_S} \cdot (k+1)-1} dLUT_t(m) \cdot \frac{\overline{w}_{t,k}^S}{\hat{w}_{t,k}^S}$$

$$= \hat{w}_{t,k}^S \cdot \frac{\overline{w}_{t,k}^S}{\hat{w}_{t,k}^S}$$

$$= \overline{w}_{t,k}^S$$

$dLUT_t^{req}(m)$ is obtained by:

$$dLUT_t^{req}(m) = \frac{\overline{w}_{t,k}^S}{\hat{w}_{t,k}^S} \cdot dLUT_t(m) \quad (17)$$

$$= \frac{\frac{2^{b_S}}{N_S \cdot 2^{b_{t,k}^S}}}{BLUT_t\left(\frac{2^{b_S}}{N_S} \cdot (k+1)\right) - BLUT_t\left(\frac{2^{b_S}}{N_S} \cdot k\right)} \cdot dLUT_t(m),$$

for $m = \frac{2^{b_S}}{N_S} \cdot k, \ldots, \frac{2^{b_S}}{N_S} \cdot (k+1) - 1$.

Denote $\alpha_{t,k}^S = \frac{\overline{w}_{t,k}^S}{\hat{w}_{t,k}^S} = \frac{\frac{2^{b_S}}{N_S \cdot 2^{b_{t,k}^S}}}{BLUT_t\left(\frac{2^{b_S}}{N_S} \cdot (k+1)\right) - BLUT_t\left(\frac{2^{b_S}}{N_S} \cdot k\right)}$ When $\alpha_{t,k}^S < 1$, the luminance range produced by the original BLUT exceeds the maximum luminance range that can be represented by the available number of codewords in the reshaped luma bin, and dLUT should be decreased.

When $\alpha_{t,k}^S > 1$, the luminance range produced by the original BLUT is below the maximum luminance range, and dLUT can be increased to compensate for the suppression of dLUT elsewhere.

The modified BLUT will be constructed by integration of the dLUT curve, e.g., using a cumulative summing of the dLUT values. Changes in one codeword of dLUT can affect the BLUT of the subsequent codewords. Therefore, changing the dLUT in darks or mid-tones can affect the BLUT in both the darks and the highlights, which may be a problem.

Unlike the method described in Application '070, here, the proposed method tries to preserve the original BLUT as much as possible so that the "master" version of the HDR signal is preserved is well. Therefore, the proposed BLUT modification is applied only in the highlights region of an image, from low luma values to higher luma values, using a two-step approach. First, in luma bins with estimated high-risk of banding, the corresponding dLUT values of those luma bins are reduced. Next, the dLUT values of the subsequent luma bins, if considered to have low risk of banding, will be slightly increased to compensate for any brightness loss. In an example embodiment, the dLUT modification is performed as described in Table 3.

TABLE 3

Example of BLUT modification to reduce banding

```
// STEP 1: compute original dLUT from original BLUT
for (m = 0; m < 2^bs - 1; m++) {
    dLUT_t(m) = BLUT_t(m + 1) - BLUT_t(m);
}
dLUT_t^mod = dLUT_t;                    // copy dLUT to modified dLUT
// STEP 2: modify dLUT
balance = 0;                            // record how much luminance has been suppressed
for (k = ⌊Ŷ · N_S⌋+ 1; k < N_S; k++ ){  // modify BLUT for highlight part only
```

TABLE 3-continued

Example of BLUT modification to reduce banding $$\alpha_{t,k}^S = \frac{\frac{2^{b_S}}{N_S \cdot 2^{b_{t,k}^S}}}{BLUT_t\left(\frac{2^{b_S}}{N_S}(k+1)\right) - BLUT_t\left(\frac{2^{b_S}}{N_S} \cdot k\right)};$$

```
if ( α_{t,k}^S < 1 ) {                    // dLUT should be suppressed
    α = max(α_{t,k}^S, α^{min});          // lower bounded by α^{min}
```

$$\text{for } \left(m = k \cdot \frac{2^{b_S}}{N_S}; m < (k+1) \cdot \frac{2^{b_S}}{N_S}; m++\right)\{$$

```
        dLUT_t^{mod}(m) = α · dLUT_t(m);
        balance = balance + (1 - α) · dLUT_t(m);
    }
}
else if ( α_{t,k}^S > 1 ) {               // dLUT can be increased if balance is positive
    α̂ = min(α_{t,k}^S, α^{max});          // upper bounded by α^{max}
```

$$\text{for } \left(m = k \cdot \frac{2^{b_S}}{N_S}; m < (k+1) \cdot \frac{2^{b_S}}{N_S}; m++\right)\{$$

```
if ( balance <= 0 )
    break;                                // do not change dLUT afterwards in the bin
```

$$\alpha = \min\left(\hat{\alpha}, 1 + \frac{balance}{dLUT_t(m)}\right);$$   // keep balance non-positive

```
        dLUT_t^{mod}(m) = α · dLUT_t(m);
    balance = balance + (1 - α) · dLUT_t(m);
}
for (k = 0; k < N_L; k++) {
```

$$\overline{\sigma}_{t,k}^E = \frac{\overline{\sigma}_{t,k}^E}{h_{t,k}^E};$$

```
    }
  }
}
// STEP 3: obtain modified BLUT from the dLUT
```

$$BLUT_t^{mod}(m) = \begin{cases} BLUT_t(m) & m = 0 \\ BLUT_t(0) + \sum_{l=0}^{m-1} dLUT_t^{mod}(l) & \text{elsewise} \end{cases}$$

//STEP 4: smooth BLUT
Apply averaging filter to the modified BLUT to reduce sharp changes;

In an embodiment, typical values for $\alpha^{max}$ and $\alpha^{min}$ are $\alpha^{max}=1.2$ and $\alpha^{min}=0$.

In some embodiments, the modified BLUT may be represented using a piece-wise linear or non-linear polynomial (e.g., an 8-piece, piece-wise polynomial using second-order segments), and the polynomial coefficients and pivot points can be described and communicated using metadata 152.

As described so far, both noise injection and BLUT modification may be employed to alleviate banding artifacts, and, in an embodiment, both use a metric of the standard deviation in luma pixels in either the original HDR image (see block 325) or the reshaped image (see block 405). There is no need to compute the standard deviation of luma pixels twice. For example, the average block standard deviation in reshaped luma bins can be derived from the original HDR luma bins using the forward reshaping function (FLUT).

Suppose the average block standard deviation $\overline{\sigma}_{t,k}^E$ and histograms $h_{t,k}^E$ values per HDR luma bin are available (see Table 1), then, in an example embodiment, the average block standard deviation per reshaped luma bin can be obtained as depicted in Table 4.

TABLE 4

Example of computing average block standard deviation in SDR from corresponding HDR values

```
// STEP 1: initialize average block standard deviation and histograms
σ̄_{t,k}^S = 0    for k = 0, 1, . . . , N_S - 1; // average block standard deviation
h_{t,k}^S = 0    for k = 0, 1, . . . , N_S - 1; // histogram
// STEP 2: map from HDR luma bin to reshaped luma bin
for ( l = 0; l < N_S; l++ ) {
```

$$\text{for } \left(m = \frac{N_L}{N_S} \cdot l; m < \frac{N_L}{N_S}(l+1); m++\right)\{$$

TABLE 4-continued

Example of computing average block standard deviation in SDR from corresponding HDR values $$k = \left\lfloor FLUT_i\left(\frac{2^{b_E}}{N_L} \cdot \frac{2m+1}{2}\right) \cdot \frac{N_S}{2^{b_S}} \right\rfloor;$$

$$\overline{\sigma}_{t,k}^S = \overline{\sigma}_{t,k}^S + \overline{\sigma}_{t,k}^E \cdot h_{t,k}^E;$$
$$h_{t,k}^S = h_{t,k}^S + h_{t,k}^E;$$
}
}
for (k = 0; k < $N_S$; k++) {

$$\overline{\sigma}_{t,k}^S = \frac{\overline{\sigma}_{t,k}^S}{h_{t,k}^S};$$

}

In an embodiment, without limitation, for more accurate mapping, $N_L = 4N_S$.

Highlights Separation Threshold

The threshold, $\tilde{Y}$, between low-luma regions (e.g., darks and mid-tones) and highlights can be important to the visual quality of the reconstructed HDR images. A lower $\tilde{Y}$ value corresponds to larger modifications on the BLUT and less added noise. A higher $\tilde{Y}$ value corresponds to smaller modifications on the BLUT and more added noise. In an embodiment, without limitation, given PQ-coded HDR data from 0 to 10,000 nits, normalized in [0, 1), an empirical value for $\tilde{Y}$ is 0.5081, corresponding to about 100 nits. 1 may also be determined by the number of pixels that have banding risk, and whether brightness suppression to alleviate banding can be compensated back.

ALTERNATIVE EMBODIMENTS

In an embodiment, instead of using a single threshold (e.g., Y) to distinguish between darks/mid-tones and highlights, and then applying one of the two different methods to each of the regions to reduce banding artifacts, one may use two or more thresholds, say $\tilde{Y}_1, \tilde{Y}_2, \ldots \tilde{Y}_K$, to divide the luminance range into more than two sub-regions, and then apply: one of the two methods, both methods, or no methods at all to each of the specific sub-regions. For example, consider $0 \leq \tilde{Y}_1 \leq \tilde{Y}_2 < 1$, then, without loss of generality, one may attempt to reduce banding artifacts by applying the following operations:
   if (Luma≤$\tilde{Y}_2$), then apply the noise injection method;
   if (Luma), then apply the BLUT modification method.
Under this scenario, both methods are applied in the region between $\tilde{Y}_1$ and $\tilde{Y}_2$.

In other embodiments, it may be desirable to apply only one of the methods into the incoming data. For example, one may have:

if (Luma≤$\tilde{Y}_1$), then apply the noise injection method;
   else don't apply any other method,
or
   if (Luma≥$\tilde{Y}_2$) then apply the BLUT modification method;
   else don't apply any other method.

In an embodiment, instead of using a simple linear interpolation model (see equation (7)) the noise standard deviation can be determined using a more generalized model, such as:

$$P_{t,k} = \begin{cases} \min(p^{max}, \max(p^{min}, f(r_{t,k}^E, \theta))) & 0 \leq k \leq \lfloor \tilde{Y} \cdot N_L \rfloor \\ p^{min} & \text{elsewise} \end{cases} \quad (19)$$

where $f(r_{t,k}^E, \theta)$ is a function of the banding risk $r_{t,k}^E$ and the bit-rate $\theta$ of the compressed SDR bitstream. In an embodiment, $f(r_{t,k}^E, \theta)$ is non-decreasing in terms of $r_{t,k}^E$ and non-increasing in terms of $\theta$. It can be linear or non-linear.

Low Bit-Depth Considerations

While most HDR-coding implementations are expected to use at least a 10-bit video-codec implementation (e.g., HEVC Main-10) for the baseline SDR layer, some systems may utilize legacy 8-bit codec implementation (e.g., 8-bit AVC) causing more severe banding artifacts. This section provides some alternative embodiments upon those discussed so far to further improve the removal of banding artifacts. While these techniques are particularly effective when using 8-bit codecs, they are also applicable to implementations using higher bit-depth codecs (e.g., 10-bit or higher).

As discussed earlier, in an embodiment, noise is added to the HDR luma component according to the estimated banding risk. For example, in an embodiment, the noise standard deviation $p_{t,k}$ (322) of each luma bin may be determined according to equation (7). In an embodiment, equation (7) may be modified as:

$$P_{t,k} = \begin{cases} clip3((a \cdot r_{t,k}^E + d) \cdot \eta_k, p^{min}, p^{max}) & 0 \leq k \leq \lfloor \tilde{Y} \cdot N_L \rfloor \\ p^{min} & \text{elsewise} \end{cases} \quad (20)$$

where $\tilde{Y}$ is a separation point between highlights and darks in a normalized PQ domain ($\tilde{Y} \in [0,1)$), $p^{max}$ is the upper bound, $p^{min}$ the lower bound, a and d are constants, and $\eta_k$ is a new scale (or modulation) factor which is non-increasing with luminance. For example, typical values include $\tilde{Y}=0.5081$ (corresponding to 100 nits), a=120, d=0, $p^{min}=0$, and $p^{max}=1500$.

In an embodiment, $\eta_k$ may be described as a piece-wise function with three main parts: a) $\eta_k=1$ up to a darks threshold, b) $\eta_k$ is a monotonically non-increasing function between the darks threshold and a highlights threshold, and c) $\eta_k=0$ after the highlights threshold. For example, an empirical description of $\eta_k$ may be given by:

$$\eta_k = \begin{cases} 1 & 0 \leq k < \lfloor \hat{Y}_1 \cdot N_L \rfloor \\ \dfrac{0.5}{\lfloor \hat{Y}_1 \cdot N_L \rfloor - \lfloor \hat{Y}_2 \cdot N_L \rfloor} \cdot k + 1 - \dfrac{0.5}{\lfloor \hat{Y}_1 \cdot N_L \rfloor - \lfloor \hat{Y}_2 \cdot N_L \rfloor} \cdot \lfloor \hat{Y}_1 \cdot N_L \rfloor & \lfloor \hat{Y}_1 \cdot N_L \rfloor \leq k \leq \lfloor \hat{Y}_2 \cdot N_L \rfloor \\ \dfrac{0.5}{\lfloor \hat{Y}_2 \cdot N_L \rfloor - \lfloor \tilde{Y} \cdot N_L \rfloor - 1} \cdot k - \dfrac{0.5}{\lfloor \hat{Y}_2 \cdot N_L \rfloor - \lfloor \tilde{Y} \cdot N_L \rfloor - 1} \cdot (\lfloor \tilde{Y} \cdot N_L \rfloor + 1) & \lfloor \hat{Y}_2 \cdot N_L \rfloor < k \leq \lfloor \tilde{Y} \cdot N_L \rfloor \\ 0 & \lfloor \tilde{Y} \cdot N_L \rfloor < k < N_L \end{cases}$$

where between the darks threshold and the highlights threshold $\eta_k$ is described using a simple two-piece linear polynomial.

Figure 5:
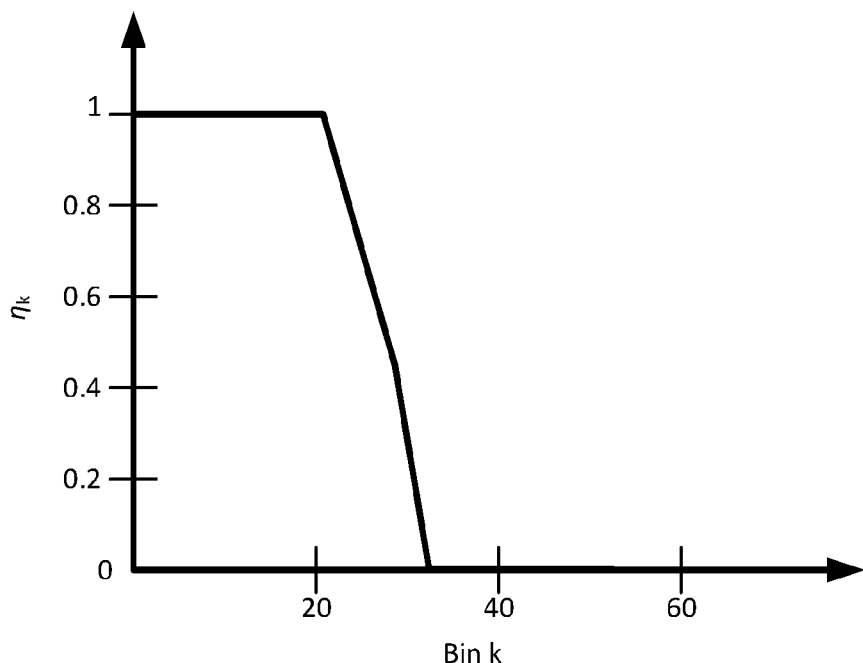
FIG. 5 depicts an example plot for a scaler ($\eta_k$) to modulate the standard deviation of noise to be injected according to an embodiment of this invention.

For $N_L=64$, example empirical values for $\hat{Y}_1$, $\hat{Y}_2$ and $\hat{Y}$ which determine the segments of the piece-wise representation are: $\lfloor \hat{Y}_1 \cdot N_L \rfloor = 20$ (darks threshold), $\lfloor \hat{Y}_2 \cdot N_L \rfloor = 30$, and $\lfloor \hat{Y} \cdot N_L \rfloor = 32$ (highlights threshold). An example plot for $\eta_k$ is depicted in FIG. 5.

The motivation for this modulation factor is to reduce the amount of noise added in the highlights. For a gamma-encoded base layer, because the encoder typically assigns few bits to high luminance pixels, thus one may see blocky artifacts if there is added noise in these regions, one may even want to avoid adding any noise in very high luminance (e.g., set $\eta_k=0$). The proposed $\eta_k$ scaler allows the added noise to be less annoying in the mid-tones (e.g., 10-100 nits) but still be strong enough to cover banding artifacts.

From equation (8), the standard deviation of a bin is used to generate noise with the same standard deviation across all codewords in the bin, which may yield observable, but artificial, boundaries between noisy and clean regions in the image. To reduce this windowing effect, in an embodiment, the computed standard deviation is filtered and then adjusted individually for each luma codeword within a bin. An example embodiment will be described next.

Denote as $\hat{p}_{t,m}$ the noise standard deviation of codeword m. Then, given $p_{t,k}$ (e.g., as computed by equations (7) or (20)), Table 5 depicts in pseudocode how to generate the $\hat{p}_{t,m}$ values.

TABLE 5

Example process to generate codeword-based noise standard deviation

// STEP 1: initialize average block standard deviation and histograms
$\hat{p}_{t,m} = 0$ for m = 0,1, . . . ,$2^{b_E} - 1$;    // $b_E$ is bit depth of source HDR
// STEP 2: copy standard deviation of each bin to each codeword in the bin
for ( m = 0; m < $2^{b_E}$; m++ ) {

$$k = \left\lfloor \frac{m}{2^{b_E}} \cdot N_L \right\rfloor;$$

$\hat{p}_{t,m} = p_{t,k}$;
}
// STEP 3: apply an average moving filter to $\hat{p}_{t,m}$
$L_F = 2^{b_E-5} + 1$;    // $L_F$ is the length of filter, $b_E - 5$ is empirical
{tmp$_m$} = AverageFilter({$\hat{p}_{t,m}$}, $L_F$);    // output of average filter with length $L_F$
    // {tmp$_m$} = [tmp$_0$, tmp$_1$, . . . , tmp$_{2^{b_E}-1}$]
    // {$\hat{p}_{t,m}$} = [$\hat{p}_{t,0}$, $\hat{p}_{t,1}$, . . . , $\hat{p}_{t,2^{b_E}-1}$]
// STEP 4: Take the max of the filtered value and the original value
for ( m = 0; m < $2^{b_E}$; m++ ) {
    $\hat{p}_{t,m} = \max(\hat{p}_{t,m}, \text{tmp}_m)$;
}
// STEP 5: apply an average moving filter to $\hat{p}_{t,m}$ again
$\hat{p}_{t,m}$ = AverageFilter($\hat{p}_{t,m}$, $L_F$);

An example of the AverageFilter( ) function is provided in Table 6.

TABLE 6

Example implementation of an average filter to smooth noise variance function x = AverageFilter(x, $L_F$)
// suppose the length of x is M.
// x = [$x_0$, $x_1$, . . . , $x_{M-1}$]

$$lh = \left\lfloor \frac{L_F - 1}{2} \right\rfloor;$$    // left side of filter TABLE 6-continued Example implementation of an average filter to smooth noise variance rh = $L_F$ - lh - 1;    // right side of filter
for (m = lh; m < M - rh; m++ ) {
    s = 0;
    for (n = m - lh; n ≤ m + rh; n++ )
        s = s + $x_n$;

$$x_m = \frac{s}{L_F};$$

}

Denote $n_{t,i}^Y$ as the i-th pixel in the noise image of the luma component of the t-th frame, and let $\ddot{v}_{t,i}^Y$ of denote the i-th pixel in the luma plane of the t-th HDR frame. Then, the dithered t-th HDR image is obtained by:

$$\tilde{v}_{t,i}^Y = \max(0, \min(2^{b_E}-1, \ddot{v}_{t,i}^Y + p_{t,v_{t,i}}^Y \cdot n_{t,i}^Y)) \text{ for } i \in \Phi_t, \qquad (21)$$

where $\Phi_t$ denotes the indexes of pixels that do not belong to any letter-box or pillar-box regions of frame t.

The proposed approach smooths the standard deviation of the noise being used across codewords. Without the proposed filtering, a typical plot of the noise standard deviation appears rather blocky, yielding clear boundaries of different values of noise strength in the image. Using the average filter twice makes the noise strength of many codewords much lower than before filtering. The proposed filtering preserves the noise strength better while reducing noise-windowing artifacts.

FLUT Adjustment in the Darks

As discussed earlier, given the dithered HDR image (312) (e.g., computed by equation (21)), and the forward reshaping function (FLUT), in step 132, the reshaped image (134) is computed according to equation (9) as a function of the forward reshaping function FLUT. After adding noise to the dark part of the source HDR luma plane, depending on the noise, the smallest luma values in the image can be lower than before. Denote the smallest HDR luma value before noise injection as $\ddot{v}_{t,i}^{Y,min}$, and the smallest HDR luma value after noise injection as $\tilde{v}_{t,i}^{Y,min}$. The original FLUT clips out any value below $\tilde{v}_{t,i}^{Y,min}$ to SDR value $\ddot{s}_{t,i}^{Y,min}=\text{FLUT}_t(\ddot{v}_{t,i}^{Y,min})$, which is typically bounded by the SMPTE range of allowed values. Such clipping may remove the dithering effect. To address this issue, a method is proposed to adjust the lower part of the FLUT (e.g., in the darks).

Figure 6:
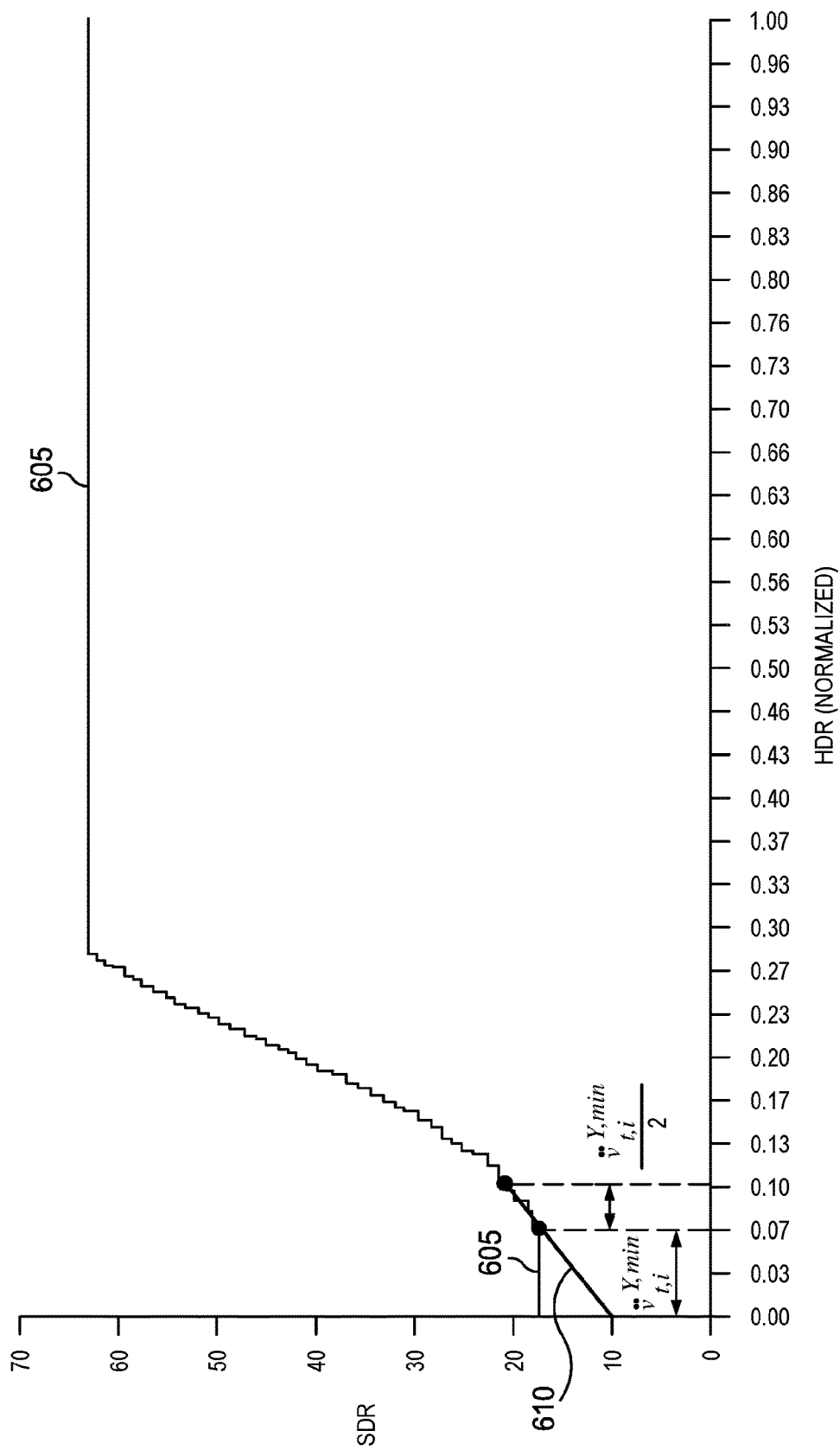
FIG. 6 depicts an example of extending the lower-end (the darks) of a forward reshaping function according to an embodiment of this invention.

FIG. 6 depicts an example FLUT (605) for normalized HDR luma values. In an embodiment, values of this curve below $\ddot{v}_{t,i}^{Y,min}$ will be extended (e.g., by segment 610) using a linear function with slope $$\kappa = \frac{FLUT_t\left(\frac{3}{2}\ddot{v}_{t,i}^{Y,min}\right) - FLUT_t(\ddot{v}_{t,i}^{Y,min})}{\frac{1}{2}\ddot{v}_{t,i}^{Y,min}}, \quad (22)$$

and a starting point determined by ($\ddot{v}_{t,i}^{Y,min}$, $FLUT_t(\ddot{v}_{t,i}^{Y,min})$).

The linear function can be expressed as:

$$FLUT_t(m) = \kappa \cdot (m - v_{t,i}^{Y,min}) + FLUT_t(\ddot{v}_{t,i}^{Y,min}), \text{ for } 0 \le m < v_{t,i}^{Y,min}. \quad (23)$$

In an embodiment, the output of this linear function is quantized to integer values, and then clipped to a lower bound for SDR values by a threshold $\tilde{S}$ ($0 < \tilde{S} \le \tilde{s}_{t,i}^{Y,min}$, e.g., $\tilde{S}=10$). An example of the FLUT adjustment process is depicted in Table 7. Note that, as depicted in Table 7, after adjusting the low-end of the FLUT one needs to adjust the corresponding BLUT as well.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to reducing banding artifacts, such as those described herein. The computer and/or IC may compute, any of a variety of parameters or values that relate to reducing banding artifacts as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement reducing banding artifacts methods as described above by executing software instructions in a program memory accessible to the processors. The invention may also be

TABLE 7

Example process to extend the low-end of a FLUT

// STEP 1: compute slope $$\kappa = \frac{FLUT_t\left(\frac{3}{2}\ddot{v}_{t,i}^{Y,min}\right) - FLUT_t(\ddot{v}_{t,i}^{Y,min})}{\frac{1}{2}v_{t,i}^{Y,min}}$$

// STEP 2: modify low-end of FLUT for $\left(m = 0; m < \ddot{v}_{t,i}^{Y,min}; m = m + \frac{1}{2^{b_E}}\right)${     // $b_E$ is bit depth of source HDR $FLUT_t(m) = \max(\lfloor \kappa \cdot (m - \ddot{v}_{t,i}^{Y,min}) + FLUT_t(\ddot{v}_{t,i}^{Y,min}) + 0.5 \rfloor, \tilde{S})$;
}
// STEP 3: modify low-end of BLUT
b = $FLUT_t(0)$;
v0 = 0;           // first HDR value
v1 = 0;           // last HDR value
s0 = 0;           // first HDR value for $\left(m = \frac{1}{2^{b_E}}; m \le \ddot{v}_{t,i}^{Y,min}; m = m + \frac{1}{2^{b_E}}\right)${ if ($FLUT_t(m) != b$){

$v1 = m - \frac{1}{2^{b_E}}$;

$BLUT_t(b) = \frac{v0 + v1}{2}$;

if ( v0 ++ 0){
      s0 = b;
    }
    v0 = m ;           // update first value of the segment
    b = $FLUT_t(m)$;
  }
}
for ( b = 0 ; b < s0 ; b + + ) {
  $BLUT_t(b) = BLUT_t(s0)$
} provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to reducing banding artifacts for HDR images are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE1 In an apparatus comprising one or more processors, a method for reducing banding artifacts, the method comprising:
  receiving an input image (120) in a first dynamic range;
  receiving an input forward reshaping function mapping codewords from the first dynamic range to a second dynamic range, wherein the second dynamic range is equal or lower than the first dynamic range;
  accessing a first backward reshaping function based on the input forward reshaping function, wherein the first backward reshaping function maps codewords from the second dynamic range to the first dynamic range;
  determining within the first dynamic range of the input image a first luma region and a second luma region;
  for luma pixel values of the input image in the first luma region:
    generating output noise with zero mean and a noise standard deviation;
    adding the output noise to the luma pixel values of the input image to generate a dithered input image, wherein the noise standard deviation is based on first statistical data derived from the input image, the input forward reshaping function, and a risk measure of banding artifacts in the first luma region; and
    applying the input forward reshaping function to the dithered input image to generate a reshaped input in the second dynamic range;
  for luma pixel values of the input image in the second luma region:
    modifying the first backward reshaping function to generate a second backward reshaping function, wherein the first backward reshaping function is modified based on second statistical data derived from the input image, the input forward reshaping function, and a risk measure of banding artifacts in the second luma region;
  coding the reshaped input to generate a coded input; and
  communicating to a decoder the coded input and the second backward reshaping function.

EEE2. The method of EEE 1, further comprising:
  in a decoder comprising one or more processors,
    receiving the coded input and the second backward reshaping function;
    decoding the coded input to generate a first output image in the second dynamic range; and
    applying the second backward reshaping function to the first output image to generate a second output image in the first dynamic range.

EEE3. The method of EEE1 or EEE2, wherein the first dynamic range is a high dynamic range and the second dynamic range is a standard dynamic range.

EEE4 The method of any preceding EEEs, wherein generating the output noise comprises:
  generating pixel values of film-grain noise with standard deviation equal to one;
  generating a minimum number of required codewords to encode the input image based on the first statistical data derived from the input image;
  generating a number of available codewords to encode the input image based on the input forward reshaping function;
  subtracting the number of available codewords from the minimum number of required codewords to generate the risk measure of banding artifacts in the first luma region;
  computing the noise standard deviation based on the risk measure of banding artifacts in the first luma region; and
  multiplying the noise standard deviation with the pixel values of the first film-grain noise to generate pixel values of the output noise.

EEE5. The method of EEE4, wherein computing the first statistical data from the input image comprises:
  dividing the first dynamic range into non-overlapping luma-range bins; and
  for each bin computing a standard deviation of luma pixels in the input image belonging to that bin.

EEE6. The method of EEE4 or EEE5, wherein computing the noise standard deviation comprises computing:

$$p=\alpha*r+d,$$

where p denotes the noise standard deviation, r denotes the risk measure of banding artifacts, and a and d are constants.

EEE7. The method of EEE4 or EEE5, wherein computing the noise standard deviation comprises computing:

$$p=(\alpha*r+d)*n,$$

where p denotes the noise standard deviation, r denotes the first risk measure, a and d are constants, and n is a scaler that depends on luminance.

EEE8. The method of EEE6 or EEE7, wherein computed values of the noise standard deviation are further smoothed by an average moving filter before being applied to generate the output noise.

EEE9. The method of any of the preceding EEEs, wherein before applying the input forward reshaping function to the dithered input image to generate a reshaped input image in the second dynamic range, further comprising adjusting the input forward reshaping function, wherein adjusting the input forward reshaping function comprises:
  determining a range $(0, \ddot{v}_{min})$ in the first dynamic range for which the input forward reshaping function generates a minimum constant output value $FLUT(\ddot{v}_{min})$ in the second dynamic range;
  determining a linear function based on $\ddot{v}_{min}$ and the input forward reshaping function;
  adjusting the input forward reshaping function between 0 and $\ddot{v}_{min}$ according to the linear function to generate an adjusted input forward reshaping function; and
  replacing the input forward reshaping function with the adjusted input forward reshaping function.

EEE10. The method of EEE9 further comprising:
  generating an updated backward reshaping function based on the adjusted input forward reshaping function; and
  replacing the first backward reshaping function with the updated backward reshaping function.

EEE11. The method of EEE9, wherein adjusting the input forward reshaping function comprises computing:

$$FLUT(m)=k(m-\ddot{v}_{min})+FLUT(\ddot{v}_{min}), \text{ for } 0 \le m < \ddot{v}_{min},$$

where k denotes the slope of the linear function and FLUT( ) denotes the input forward reshaping function.

EEE12. The method of any preceding EEEs, wherein modifying the first backward reshaping function comprises:
  generating second statistical data based on the input image and the input forward reshaping function;
  generating a risk of banding artifacts in the second luma region;
  computing a derivative function based on the first backward reshaping function;
  modifying the derivative function based on the risk of banding artifacts in the second luma region and the second statistical data to generate a modified derivative function; and
  generating the second backward reshaping function based on the modified derivative function.

EEE13. The method of EEE12, wherein computing the second statistical data from the input image comprises:
  dividing the second dynamic range into non-overlapping luma-range bins; and
  for each bin computing a standard deviation of luma pixels of a reshaped image belonging to that bin, wherein the reshaped image is generated by applying the input forward reshaping function to the input image.

EEE14. The method of EEE12 or EEE13, wherein computing the derivative function comprises computing $$dLUT_t(m)=BLUT_t(m+1)-BLUT_t(m),$$

where $dLUT_t(m)$ denotes the derivative function, and $BLUT_t(m)$ denotes the first backward reshaping function for input codeword m.

EEE15. The method of any one of EEEs 12 to 14, wherein computing the risk of banding artifacts in the second luma region comprises:
  dividing the second dynamic range into Ns non-overlapping luma-range bins; and computing $$\alpha_{t,k}^S = \frac{\frac{2^{b_S}}{N_S \cdot 2^{b_{t,k}^S}}}{BLUT_t\left(\frac{2^{b_S}}{N_S} \cdot (k+1)\right) - BLUT_t\left(\frac{2^{b_S}}{N_S} \cdot k\right)},$$

where $b_s$ denotes a bit-depth of the second dynamic range, $b_{t,k}^S$ denotes the minimum bit-depth required for bin k in the second dynamic range, $BLUT_t( )$ denotes the first backward reshaping function, and $\alpha_{t,k}^S$ denotes a risk of banding artifacts in the second luma region.

EEE16. The method of EEE15, wherein modifying the derivative function comprises computing $$dLUT_t^{mod}(m)=\alpha \cdot dLUT_t(m),$$

where $dLUT_t( )$ denotes the derivative function, $dLUT_t^{mod}(m)$ denotes the modified derivative function, and a is proportional to $\alpha_{t,k}^S$.

EEE17. The method of EEE16, wherein generating the second backward reshaping function $BLUT_t^{mod}(m)$ comprises computing $$BLUT_t^{mod}(m) = \begin{cases} BLUT_t(m) & m=0 \\ BLUT_t(0) + \sum_{l=0}^{m-1} dLUT_t^{mod}(l) & \text{elsewise} \end{cases},$$

where $BLUT_t(m)$ denotes the first backward reshaping function for input codeword m.

EEE18. The method of any preceding EEEs, wherein the first luma region and the second luma region are overlapping image regions.

EEE19. A non-transitory computer-readable storage medium having stored thereon computer-executable instructions for executing with one or more processors a method in accordance with any one of the EEEs 1-18.

EEE20. An apparatus comprising a processor and configured to perform any one of the methods recited in EEEs 1-18.

The invention claimed is:

1. A method for reducing banding artifacts comprising:
  receiving an input image in a first dynamic range;
  receiving an input forward reshaping function mapping codewords from the first dynamic range to a second dynamic range, wherein the second dynamic range is equal or lower than the first dynamic range;
  accessing a first backward reshaping function based on the input forward reshaping function, wherein the first backward reshaping function maps codewords from the second dynamic range to the first dynamic range;
  determining within the first dynamic range of the input image a first luma region and a second luma region;
  for luma pixel values of the input image in the first luma region:
    generating output noise with zero mean and a noise standard deviation;
    adding the output noise to the luma pixel values of the input image to generate a dithered input image, wherein the noise standard deviation is based on first statistical data derived from the input image, a number of available codewords to encode the input image using the input forward reshaping function, and a first risk measure estimating the risk of having banding artifacts in the first luma region; and applying the input forward reshaping function to the dithered input image to generate a reshaped input image in the second dynamic range;

for luma pixel values of the input image in the second luma region:

adjusting the slope of the first backward reshaping function to generate a second backward reshaping function for reducing banding artifacts in the second luma region, wherein the slope of the first backward reshaping function is adjusted based on second statistical data derived from the input image, the input forward reshaping function, and a second risk measure estimating the risk of having banding artifacts in the second luma region;

coding the reshaped input image to generate a coded input image; and communicating to a decoder the coded input image and the second backward reshaping function; wherein the first statistical data and second statistical data are generated by dividing the respective first dynamic range and second dynamic range into non-overlapping luma-range bins, and, for each bin, computing a standard deviation of luma pixel values in the respective input image and reshaped input image belonging to that bin.

2. The method of claim 1, further comprising:

receiving the coded input image and the second backward reshaping function;

decoding the coded input image to generate a first output image in the second dynamic range; and applying the second backward reshaping function to the first output image to generate a second output image in the first dynamic range.

3. The method of claim 1, wherein the first dynamic range is a high dynamic range and the second dynamic range is a standard dynamic range.

4. The method of claim 1, wherein generating the output noise comprises:

generating pixel values of film-grain noise with standard deviation equal to one;

generating a minimum number of required codewords to encode the input image based on the first statistical data derived from the input image;

generating the number of available codewords to encode the input image based on the input forward reshaping function;

subtracting the number of available codewords from the minimum number of required codewords to generate the first risk measure;

computing the noise standard deviation based on the first risk measure; and multiplying the noise standard deviation with the pixel values of the first film-grain noise to generate pixel values of the output noise.

5. The method of claim 4, wherein computing the noise standard deviation comprises computing:

$p = \sigma * r + d,$ where p denotes the noise standard deviation, r denotes the first risk measure, and a and d are constants.

6. The method of claim 5, wherein computed values of the noise standard deviation are further smoothed by an average moving filter before being applied to generate the output noise.

7. The method of claim 4, wherein computing the noise standard deviation comprises computing:

$p = (a * r + d) * n,$ where p denotes the noise standard deviation, r denotes the first risk measure, a and d are constants, and n is a scaler that depends on luminance.

8. The method of claim 1, wherein before applying the input forward reshaping function to the dithered input image to generate a reshaped input image in the second dynamic range, further comprising adjusting the input forward reshaping function, wherein adjusting the input forward reshaping function comprises:

determining a range $(0, \ddot{v}_{rmin})$ in the first dynamic range for which the input forward reshaping function generates a minimum constant output value $FLUT(\ddot{v}_{min})$ in the second dynamic range;

determining a linear function based on $\ddot{v}_{min}$ and the input forward reshaping function;

adjusting the input forward reshaping function between 0 and $\ddot{v}_{min}$ according to the linear function to generate an adjusted input forward reshaping function; and replacing the input forward reshaping function with the adjusted input forward reshaping function.

9. The method of claim 8, wherein adjusting the input forward reshaping function comprises computing:

$FLUT(m) = k(m - \ddot{v}_{min}) + FLUT(\ddot{v}_{min}),$ for $0 \leq m \leq \ddot{v}_{miii},$ where k denotes the slope of the linear function and FLUT( ) denotes the input forward reshaping function.

10. The method of claim 1, wherein adjusting the slope of the first backward reshaping function comprises:

generating the second statistical data based on the input image and the input forward reshaping function;

generating the second risk measure;

computing a first derivative of the first backward reshaping function;

modifying the first derivative based on the second risk measure and the second statistical data to generate a modified first derivative; and generating the second backward reshaping function based on the modified derivative function.

11. The method of claim 10, wherein computing the first derivative of the first backward reshaping function comprises computing $dLUT_t(m) = BLUT_t(m+1) BLUT_t(m),$ where $dLUT_t(m)$ denotes the first derivative, and $BLUT_t(m)$ denotes the first backward reshaping function for input codeword m.

12. The method of claim 1, wherein the second risk measure of having banding artifacts in the second luma region is generated by:

dividing the second dynamic range into $N_S$ non-overlapping luma-range bins; and computing $$\alpha_{t,k}^S = \frac{\frac{2^{b_S}}{N_S \cdot 2^{b_{t,k}^S}}}{BLUT_t\left(\frac{2^{b_S}}{N_S} \cdot (k+1)\right) - BLUT_t\left(\frac{2^{b_S}}{N_S} \cdot k\right)},$$

where $b_s$ denotes a bit-depth of the second dynamic range, $b_{t,k}^S$ denotes the minimum bit-depth required for bin k in the second dynamic range, $$BLUT_t\left(\frac{2^{b_s}}{N_s} \cdot k\right)$$

denotes the first backward reshaping function for input codeword $$\frac{2^{b_s}}{N_s} \cdot k,$$

and $\alpha_{t,k}^S$ denotes the second risk measure.

13. The method of claim 12, wherein modifying the first derivative comprises computing $$dLUT_t^{mod}(m) = \alpha \cdot dLUT_t(m),$$

where $dLUT_t(\ )$ denotes the first derivative, $dLUT_t^{mod}(m)$ denotes the modified first derivative, and a is proportional to $\alpha_{t,k}^S$.

14. The method of claim 13, wherein generating the second backward reshaping function $BLUT_t^{mod}(m)$ comprises computing $$BLUT_t^{mod}(m) = \begin{cases} BLUT_t(m) & m = 0 \\ BLUT_t(0) + \sum_{l=0}^{m-1} dLUT_t^{mod}(l) & \text{elsewise} \end{cases},$$

where $BLUT_t(m)$ denotes the first backward reshaping function for input codeword m.

15. A non-transitory computer-readable storage medium having stored thereon computer-executable instructions for executing with one or more processors a method in accordance with claim 1.

* * * * *

UNITED STATES PATENT AND TRADEMARK OFFICE
CERTIFICATE OF CORRECTION

PATENT NO. : 11,277,646 B2
APPLICATION NO. : 17/282523
DATED : March 15, 2022
INVENTOR(S) : Qing Song et al.

Page 1 of 1

It is certified that error appears in the above-identified patent and that said Letters Patent is hereby corrected as shown below:

In the Claims

Column 27

In Claim 1, Line 26, after "by", insert --:--

In Claim 5, Line 65, replace "$p=\sigma*r+d$," with --$p = a * r + d$.--

Column 28

In Claim 8, Line 18, replace "$(0, \tilde{v}_{rmin})$" with --$(0, \ddot{v}_{min})$--

In Claim 9, Line 31, replace "$0 \leq m \leq \tilde{v}_{min}$," with --$0 \leq m < \ddot{v}_{min}$,--

In Claim 11, Line 49, replace "$dLUT_t(m)=BLUT_t(m+1)BLUT_t(m)$" with --$dLUT_t(m)=BLUT_t(m+1)-BLUT_t(m)$,--

Column 29

In Claim 12, Line 2, replace "$b_{tk}{}^S$" with --$b^S_{t,k}$--

Column 30

In Claim 13, Line 2, replace "a" with --α--

Signed and Sealed this
Thirtieth Day of July, 2024

Katherine Kelly Vidal
*Director of the United States Patent and Trademark Office*